(12) United States Patent
Heudorfer et al.

(10) Patent No.: US 6,402,190 B1
(45) Date of Patent: Jun. 11, 2002

(54) NON RETURN VALVE FOR AN AIRBAG

(75) Inventors: Benedikt Heudorfer, Nersingen;
Patrick David; Jochen Maidel, both of Ulm, all of (DE)

(73) Assignee: Takata (Europe) Vehicle Safety Technology GmbH, Ulm (DE)

( * ) Notice: Subject to any disclaimer, the term of this patent is extended or adjusted under 35 U.S.C. 154(b) by 0 days.

(21) Appl. No.: 09/608,435

(22) Filed: Jun. 30, 2000

(30) Foreign Application Priority Data

Jun. 30, 1999 (DE) .......................... 199 30 155

(51) Int. Cl.⁷ .................... B60R 21/24; B60R 21/16; F16K 15/14
(52) U.S. Cl. .................... 280/729; 280/728.1; 137/846
(58) Field of Search .................... 280/729, 739, 280/742, 728.1; 137/846

(56) References Cited

U.S. PATENT DOCUMENTS

| | | | | |
|---|---|---|---|---|
| 3,118,468 A | * | 1/1964 | Bochan | 137/525.1 |
| 3,422,844 A | * | 1/1969 | Grise | 137/525.1 |
| 3,822,720 A | * | 7/1974 | Souza | 137/525.1 |
| 5,144,708 A | * | 9/1992 | Pekar | 137/846 |
| 5,697,641 A | | 12/1997 | McGee et al. | 280/743.1 |
| 6,019,122 A | * | 2/2000 | Chen | 137/846 |
| 6,170,513 B1 | * | 1/2001 | Lo | 137/846 |

FOREIGN PATENT DOCUMENTS

| | | |
|---|---|---|
| DE | 197 19 151 A1 | 11/1997 |
| DE | 198 56 407 A1 | 6/1999 |
| WO | WO 97/01461 | 1/1977 |

* cited by examiner

*Primary Examiner*—Brian L Johnson
*Assistant Examiner*—Joselynn Sliteris
(74) *Attorney, Agent, or Firm*—Foley & Lardner

(57) ABSTRACT

The invention relates to a non return valve for an airbag of a vehicle passenger retention system, which is provided with a connection hose between two chambers of the airbag, wherein in the connector hose a fabric inlay is accommodated. The fabric inlay subdivides the connection hose into a flow passage between the first and the second chamber and a pressure chamber which is in connection with the second chamber. As soon as the internal pressure in the first chamber is greater than that in the second chamber the fabric inlay opens the flow passage. If on the contrary the internal pressure in the second chamber is greater than that in the first chamber the fabric inlay closes off the flow passage by means of the internal pressure which acts in the pressure chamber.

10 Claims, 4 Drawing Sheets

NON RETURN VALVE FOR AN AIRBAG

FIELD OF THE INVENTION

The invention relates to a non return valve for an airbag of a vehicle passenger retention system, which forms a flow connection between two chambers of the airbag and at least partly prevents a flowing back of gas from the second chamber into the first chamber. The invention further relates to an airbag for a vehicle passenger retention system with a non return valve of this kind.

BACKGROUND OF THE INVENTION

It is known to control, by means of a non return valve, the flow connection between the chambers in an airbag for a vehicle passenger retention system with the airbag having a plurality of chambers which are in flow connection with one another.

Thus WO 97/01461 describes an airbag with two chambers which are in flow connection with one another through a non return valve. The non return valve prevents a flowing back of gas from the second chamber back into the first chamber when the internal pressure in the first chamber is lower than the internal pressure acting in the second chamber. Otherwise it opens the flow connection between the two chambers.

SUMMARY OF THE INVENTION

The object of the invention is to provide a non return valve of the initially named kind for an airbag and, respectively, an airbag with a non return valve of this kind, through the use or which and in which, respectively, a flowing back of the gas from the second chamber into the first chamber is prevented even at high pressure differences between the chambers.

The invention satisfies this object through a non return valve having a connection hose between the first and the second chamber in which a fabric inlay is accommodated which subdivides the connection hose into a flow passage between the first and the second chamber and a pressure chamber which is in connection with the second chamber. The fabric inlay opens the flow passage when the internal pressure in the second chamber is lower compared to the internal pressure in the first chamber. When the internal pressure is higher in the second chamber the fabric inlay closes off the flow passage by means of the internal pressure which acts in the pressure chamber. Furthermore, the object is satisfied by an airbag having the features described further below.

In the invention, the connection hose, which forms the flow connection between the two chambers, is subdivided by the fabric inlay into the actual flow passage and the pressure chamber. Whereas the flow passage is connected to both chambers, the pressure chamber is in connection only with the second chamber. If now the internal pressure in the first chamber is greater than that in the second chamber, the gas flows through the open flow passage into the second chamber. With increasing internal pressure in the second chamber the internal pressure acting in the pressure chamber, which is bounded by the fabric inlay, also increases, through which the fabric inlay is prestressed against the pressure acting in the flow passage. As soon as the internal pressure in the second chamber exceeds the internal pressure in the first chamber, the internal pressure acting in the pressure chamber is so high that the fabric inlay is moved against the flow pressure in the flow passage and closes off the flow passage. The pressure force, with which the fabric inlay closes the flow passage, increases with increasing pressure difference between the two chambers, so that the non return valve remains closed even at high pressure difference.

Further advantageous developments of the invention result from the following description, the drawings and the subordinate claims.

Thus in a particularly preferred embodiment, the fabric inlay is folded back to form a funnel-shaped hose and is connected to the inner wall of the connection hose near the peripheral edge of its funnel opening of larger flow cross-section. The fabric inlay is only partly connected to the inner wall of the connection hose near the peripheral edge of its funnel opening of smaller flow cross-section which protrudes into the connection hose in the direction of the second chamber. Through the funnel-shaped folding back of the fabric inlay, the fabric inlay is elastically initially prestressed in the region of its funnel opening of smaller flow cross-section, so that as soon as the internal pressure in the second chamber drops below the internal pressure acting in the first chamber after the closing of the non return valve, the non return valve opens again easily.

In a further embodiment of the non return valve a further fabric inlay is provided which is connected to the first fabric inlay and forms together with the latter a hose with approximately the same cross-section. In this the hose is connected near its inlet opening facing the first chamber to the inner wall of the connection hose, whereas its part which protrudes in the direction of the second chamber into the connection hose is freely movably accommodated in the connection hose. Through the use of the second hose in the connection hose a circumferential pressure chamber is formed so that the two fabric inlays forming the hose are uniformly pressed together approximately over their entire length when the internal pressure acting in the second chamber is greater, through which a particularly high sealing action is achieved.

Particularly advantageous is also a third embodiment of the non return valve in accordance with the invention in which the fabric inlay is connected in such a manner near its one side edge facing the first chamber to a part of the inner wall of the connection hose that an inlet opening which is bounded by the fabric inlay and the inner wall of the connection hose is formed. The fabric inlay is passed diametrically through the connection hose and is connected near its other side edge facing the second chamber at the inner wall of the connection hose to form an outlet opening, with the flow cross-section of the outlet opening being smaller than that of the inlet opening. In this design of the non return valve as well a comparatively large pressure chamber is formed in which the internal pressure which is present in the second chamber acts uniformly on the fabric inlay and prestresses against the connection hose when the pressure difference between the two chambers is sufficiently large, so that the flow passage in the connection hose is closed.

The connection hose can likewise be formed of two fabric partial pieces, preferably of two fabric partial pieces of the airbag, and is sealed off at its edges, preferably through sewing. Through the use of a multiple part connection hose it is possible to sew together the fabric inlay for forming the funnel-shaped hose in accordance with the first exemplary embodiment, or for forming the hose in accordance with the second exemplary embodiment with the edges of the two fabric partial pieces, through which a particularly durable non return valve is formed.

The invention will be explained in the following in more detail with reference to three exemplary embodiments and with reference to the drawings. Shown therein are:

DETAILED DESCRIPTION OF THE INVENTION

Figure 1:
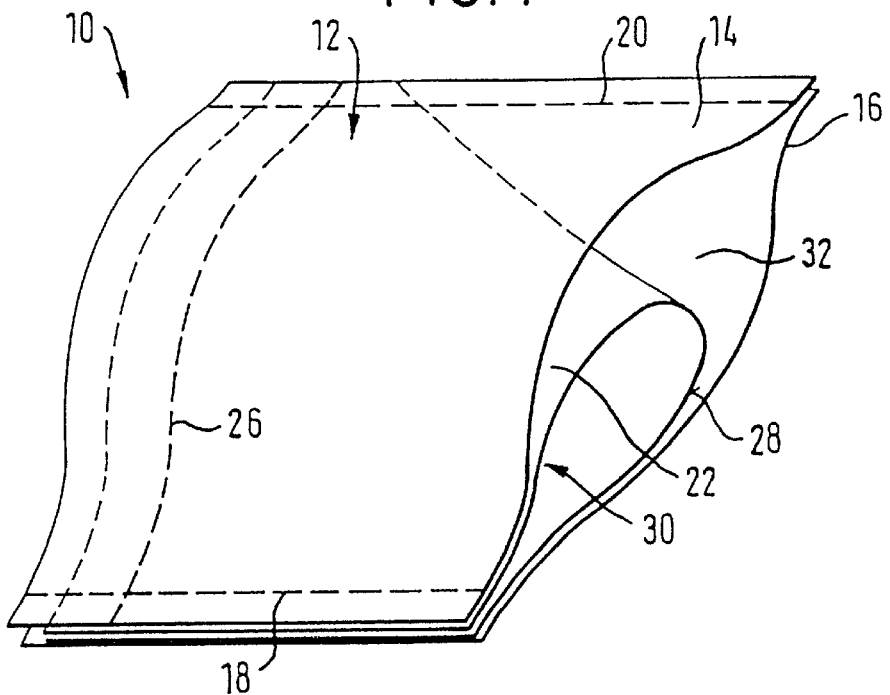
FIG. 1 a perspective illustration of a first exemplary embodiment of a non return valve for an airbag, FIG. 2 a side view in which the inlet opening of the non return valve in accordance with FIG. 1 is shown, FIG. 3 a side view in which the outlet opening of the non return valve in accordance with FIG. 1 is shown, FIG. 4 a perspective illustration of a second exemplary embodiment of a non return valve for an airbag, FIG. 5 a sectioned side view of the non return valve in accordance with FIG. 4 along the section line C—C in FIG. 4, FIG. 6 a perspective illustration of a third exemplary embodiment of a non return valve for an airbag, FIG. 7 a sectioned side view of the non return valve in accordance with FIG. 6 along the section line D—D in FIG. 6, and FIG. 8 a perspective view showing a non return valve positioned between two chambers of an airbag.

FIG. 1 shows in perspective illustration a non return valve 10 for an airbag of a vehicle passenger retention system. The non return valve 10 forms the flow connection between two chambers 200, 300 (shown in FIG. 8) of the airbag. For this purpose, the non return valve 10 has a connection hose 12 which is formed of two fabric partial pieces 14 and 16 of the airbag. The fabric partial pieces 14 and 16 can be formed as separate fabric pieces and sewn together with the fabric pieces forming the chambers of the airbag. Alternatively, it is also possible to form the connection hose as part of the fabric pieces forming the airbag.

For forming the connection hose 12, the fabric partial pieces 14 and 16 are sewn together in their edge regions by two longitudinal seams 18 and 20 which are sealed off in a gas tight manner by a sealing means. A fabric inlay 22, which is folded back to form a funnel-shaped hose, is inserted into the connection hose 12. The inner surfaces of the fabric inlay 22, which lie in mutual contact, are accommodated between the mutually facing surfaces of the fabric partial pieces 14 and 16, of the point of connection shown below in FIG. 1. Moreover, the fabric inlay 22 is sewn together with the latter by the longitudinal seam 18. Near the peripheral edge of its funnel opening 24 of larger flow cross-section (cf. FIG. 2) the folded back fabric inlay 22 is sewn to the connection hose 12 by a circumferential seam 26, with the seam 26 being sealed off in a gas tight manner here as well by a sealing means. The funnel opening 28 of the smaller flow cross-section, which is formed by the fabric inlay 22, which is folded back in the shape of a funnel, opens into the second chamber of the airbag.

Figure 2:
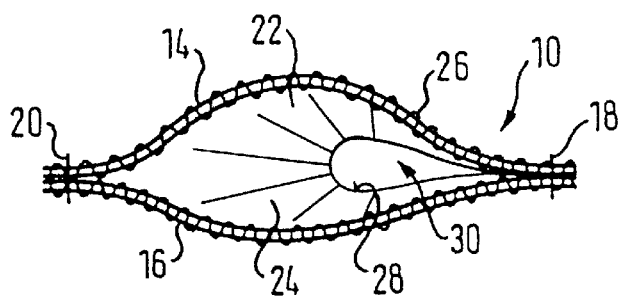
Figure 3:
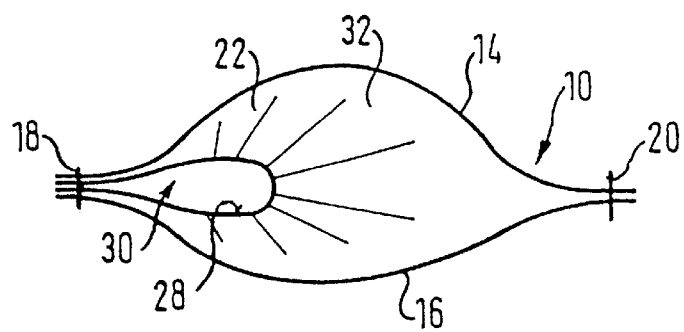

By means of the funnel-shaped folding back of the fabric inlay 22 a funnel-shaped flow passage 30 is on the one hand formed in the connection hose 12 and connects the two chambers to one another; on the other hand the fabric inlay 22 together with the connection hose 12 bounds a pressure chamber 32 which is in flow connection only with the second chamber, as is also indicated in FIGS. 2 and 3.

If now a higher pressure acts in the first chamber of the airbag than in the second chamber, gas flows from the first chamber through the funnel opening 24 of larger flow cross-section and the flow passage 30 out of the funnel opening 28 of smaller flow cross-section and into the second chamber.

As soon as the internal pressure acting in the second chamber is greater than the internal pressure acting in the first chamber the fabric inlay 22, which is folded back in the shape of a funnel, is pressed together against the pressure of the first chamber acting in the flow passage 30 by means of the internal pressure which likewise acts in the pressure chamber 32, whereby the flow passage 30 is closed. If on the contrary the pressure in the first chamber of the airbag increases again, the non return valve 10 opens by means of the pressure which acts in the flow passage 30 and which again expands the fabric inlay 22 against the pressure acting in the pressure chamber 32.

Figure 4:
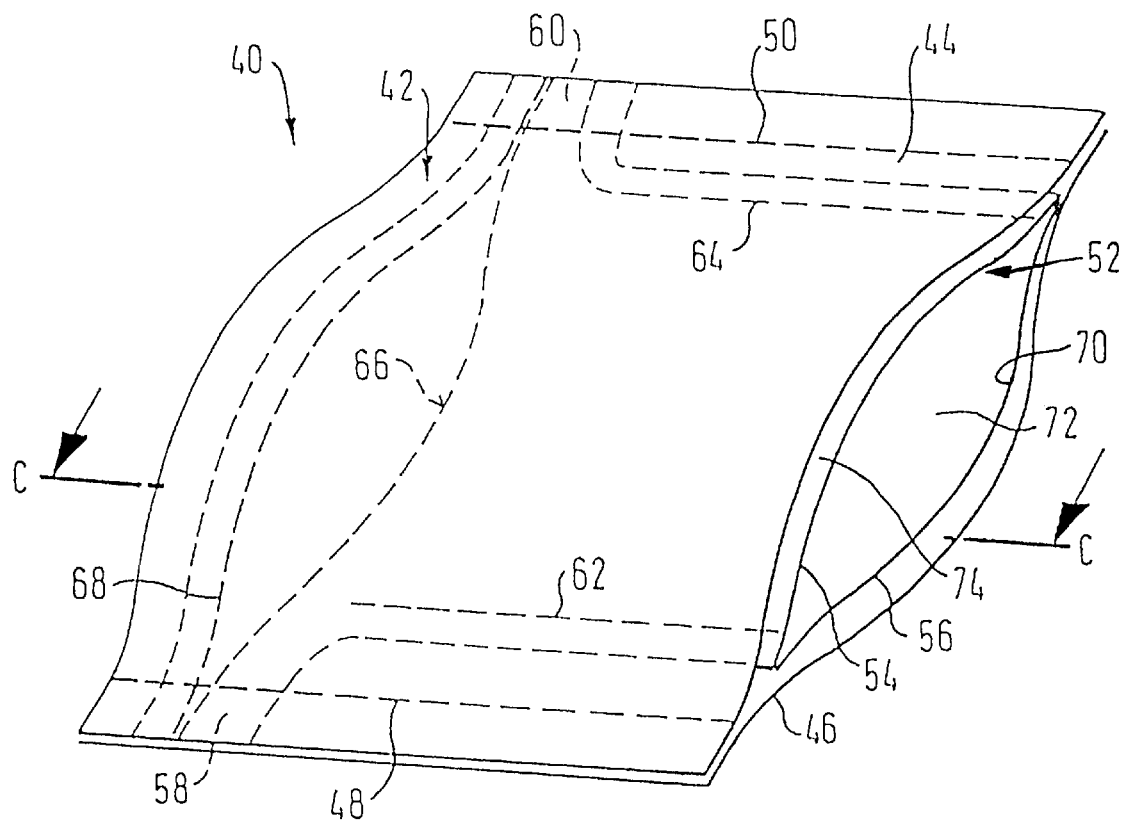

FIG. 4 shows in a perspective illustration a second embodiment of a non return valve 40 for an airbag of a vehicle passenger retention system. Here as well the non return valve 40 has a connection hose 42 which is formed of two fabric partial pieces 44 and 46 and which connects two chambers of the airbag to one another. As in the first exemplary embodiment the fabric partial pieces 44 and 46 are here as well sewn together in a gas tight manner by longitudinal seams 48 and 50 to form the connection hose 42.

A hose 52 which is formed of two fabric inlays 54 and 56 is accommodated in the connection hose 42. The two fabric inlays 54 and 56 are of identical shape and have at their end illustrated at the left in FIG. 4 in each case a securing lug 58 and 60 respectively. The securing lugs 58 and 60 of the two fabric inlays 54 and 56 are passed at both sides between the fabric partial pieces 44 and 46, which lie in mutual contact, and are sewn to the latter in a gas tight manner through the longitudinal seams 48 and 50. Furthermore, the two fabric inlays 54 and 56 are sewn to one another at their edges to form the hose 52 by two seams 62 and 64 in such a manner that the hose 52 has a flow cross-section which is approximately uniform over its entire length.

Near its inlet opening 66 which opens in the first chamber the hose 52 is sewn together with the connection hose 42 in a gas tight manner by a circumferential transverse seam 68. The other end of the hose 52, which forms an outlet opening 70 which opens into the second chamber, is freely movably accommodated in the connection hose 42.

Figure 5:
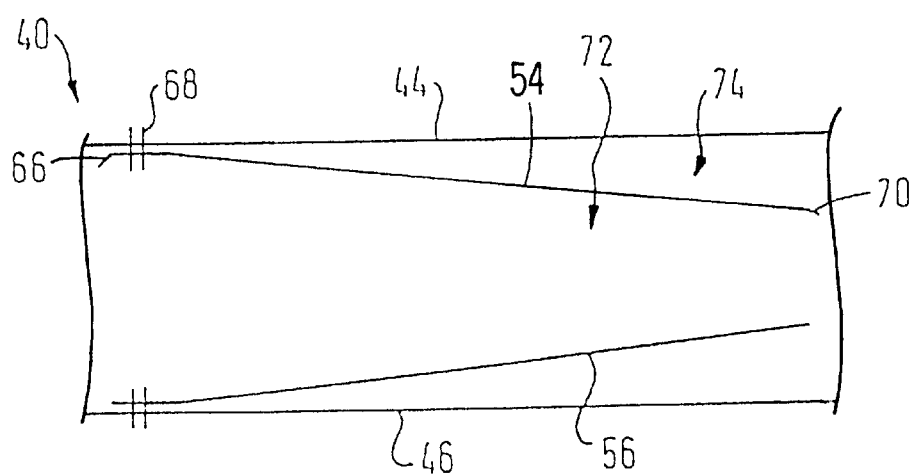

As FIG. 5 shows, the hose 52 forms a flow passage 72 in the connection hose 42 which connects the two chambers of the airbag to one another. Furthermore, the hose 52 forms a pressure chamber 74 which surrounds the hose 52 and which is in connection exclusively with the second chamber as a result of the transverse seam 68.

If a higher internal pressure acts in the first chamber of the airbag than in the second chamber, gas flows through the flow passage 72 into the second chamber. As soon as the internal pressure in the second chamber is greater than the internal pressure acting in the first chamber the two fabric inlays 54 and 56 of the hose 52 are pressed together against the pressure acting in the flow passage 72 by the pressure acting in the pressure chamber 74, through which the non return valve 40 is closed. If the pressure in the first chamber again increases, the flow passage 72 again expands against the internal pressure of the second chamber acting in the pressure chamber 74 so that gas can flow in from the first chamber into the second chamber.

Figure 6:
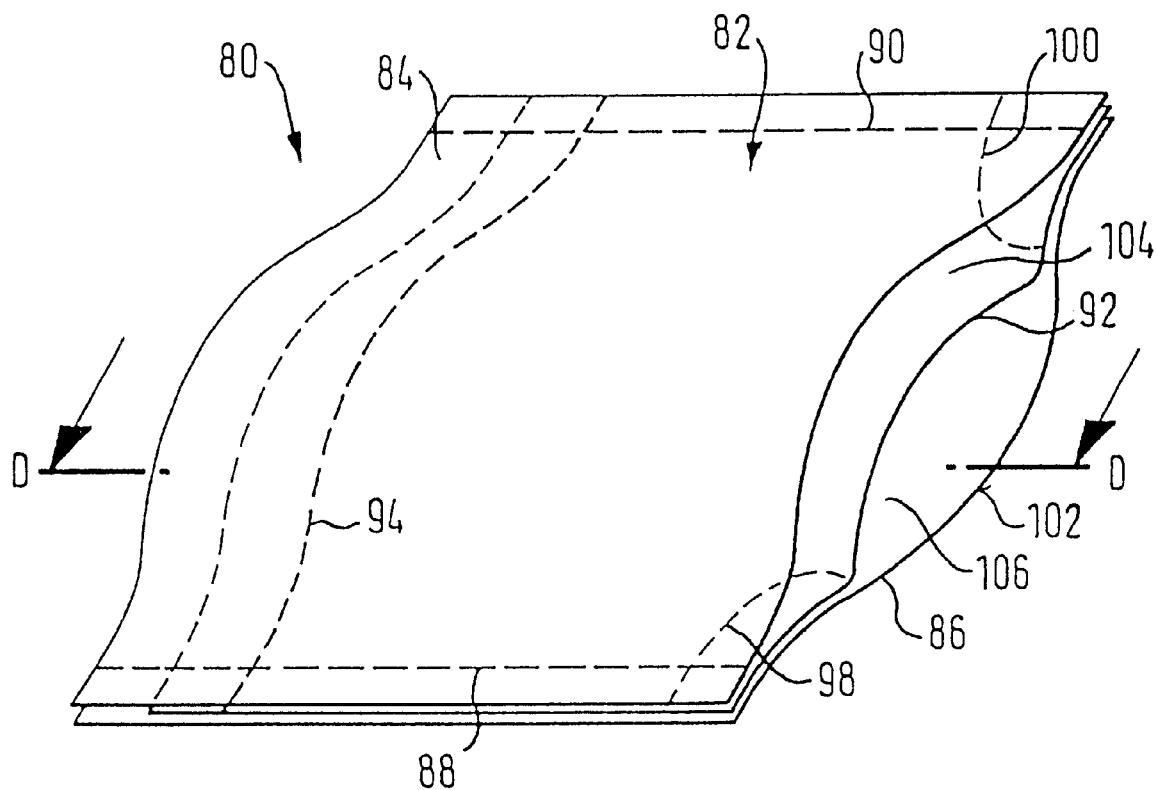

FIG. 6 shows in perspective illustration a third exemplary embodiment of a non return valve 80. In this exemplary embodiment as well, a connection hose 82 which is formed from two fabric partial pieces 84 and 86 and which connects the chambers of the airbag to one another is provided. The fabric partial pieces 84 and 86 are sewn together in a gas tight manner at their edges by longitudinal seams 88 and 90 to form the connection hose 82. A fabric inlay 92 is accommodated in the connection hose 82 and is partly introduced with its edge regions between the fabric partial pieces 84 and 86 and is sewn together with the latter by the longitudinal seams 88 and 90. The width of the fabric inlay 92 transverse to the longitudinal direction of the connection hose 82 corresponds in this approximately to the width of the two fabric partial pieces 84 and 86.

Figure 7:
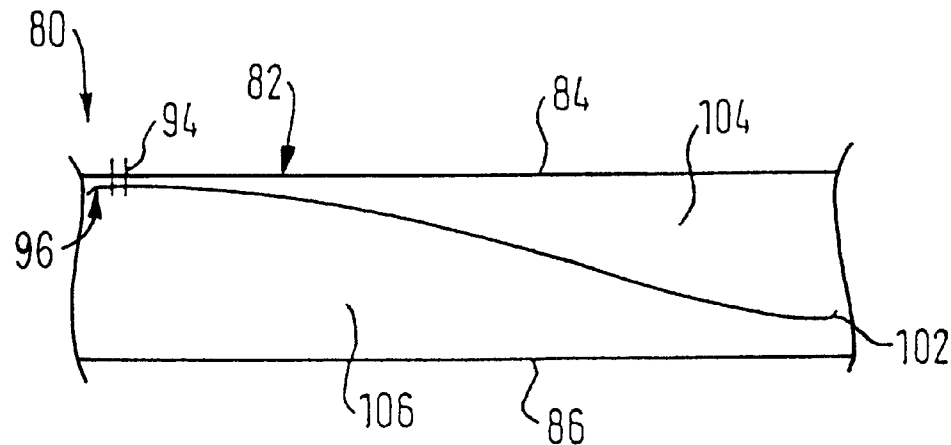

Near its side facing the first chamber the fabric inlay 92 is sewn in such a manner with the fabric partial piece 84 of the connection hose 82 which is illustrated above in FIG. 6 by a transverse seam 94 that the fabric inlay 92 bounds an inlet opening 96 with the lower fabric partial piece 86 of the connection hose 82 (cf. FIG. 7). Near its other end the fabric inlay 92 is sewn in its two corner regions to the fabric partial piece 86 which is illustrated below in FIG. 6 by two round seams 98 and 100, whereby an outlet opening 102 is formed. In this the fabric inlay 92 is sewn with the lower fabric partial piece 86 in such a manner by the round seams 98 and 100 that the flow cross-section of the outlet opening 102 is smaller than that of the inlet opening 96.

Through the diametrical path of the fabric inlay 92 through the connection hose 82 and the transverse seam 94 a pressure chamber 104 is bounded between the upper fabric partial piece 84 and the fabric inlay 92 which is in connection with the second chamber, whereas the lower fabric partial piece 86 together with the fabric inlay 92 forms a flow passage 106 having the inlet opening 96 and the outlet opening 102, as is also illustrated in FIG. 7.

If now a higher internal pressure acts in the first chamber of the airbag than in the second chamber of the airbag, gas flows through the flow passage 106 from the first chamber into the second chamber. If the internal pressure in the second chamber exceeds the internal pressure acting in the first chamber, the fabric inlay 92 is pressed against the pressure acting in the flow passage 106 against the lower fabric partial piece 86 by means of the pressure in the pressure chamber 104, which is in flow connection with the second chamber, so that the flow passage 106 is closed off. If the pressure in the first chamber again increases, the fabric inlay 92 is lifted up against the pressure in the pressure chamber 104 through the pressure acting in the flow passage 106, whereby the outlet opening 102 is again opened and gas can flow in from the first chamber into the second chamber.

Figure 8:
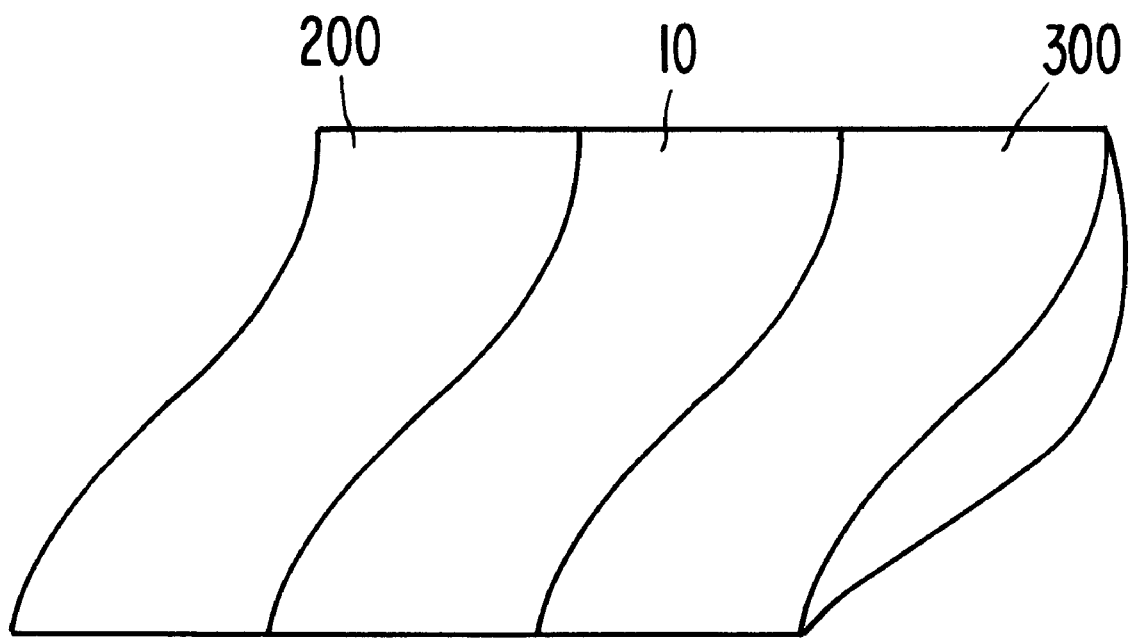

FIG. 8 shows the location of the non return valve 10 located in a connection hose between a first airbag chamber 200 and a second airbag chamber 300. If the internal pressure in the first chamber 200 is greater than the internal pressure in the second chamber 300, the gas flows through the open flow passage from the first chamber 200 into the second chamber 300. The form of the chambers 200, 300 depends on the actual airbag. If the internal pressure in the second chamber 300 is greater than the internal pressure in the first chamber 200, the flow passage in the non return valve 10 is closed.

List of Reference Symbols 10 non return valve
12 connection hose
14 fabric partial piece
16 fabric partial piece
18 longitudinal seam
20 longitudinal seam
22 fabric inlay
24 funnel opening of larger flow cross-section
26 seam
28 funnel opening of smaller flow cross-section
30 flow passage
32 pressure chamber
40 non return valve
42 connection hose
44 fabric partial piece
46 fabric partial piece
48 longitudinal seam
50 longitudinal seam
52 hose
54 fabric inlay
56 fabric inlay
58 securing lug
60 securing lug
62 seam
64 seam
66 inlet opening
68 transverse seam
70 outlet opening
72 flow passage
74 pressure chamber
80 non return valve
82 connection hose
84 fabric partial piece
86 fabric partial piece
88 longitudinal seam
90 longitudinal seam
92 fabric inlay
94 transverse seam
96 inlet opening
98 round seam
100 round seam
102 outlet opening
104 pressure chamber
106 flow passage

What is claimed is:

1. A non return valve for an airbag of a vehicle passenger retention system, which is adapted to form a flow connection between a first and a second airbag chamber, the non return valve comprising:

a connection hose which is adapted to be connected to the first and the second airbag chambers, said connection hose having a foldable fabric inlay that subdivides the connection hose into a flow passage which is adapted to connect the first and the second airbag chambers and a pressure chamber which is adapted to be connected with the second airbag chamber, wherein the fabric inlay is adapted to open the flow passage when the internal pressure in the second airbag chamber is lower compared to the internal pressure in the first airbag chamber, and wherein when the internal pressure is higher in the second airbag chamber, the fabric inlay is adapted to close the flow passage by means of the internal pressure in the pressure chamber.

2. Non return valve in accordance with claim 1, characterized in that the fabric inlay (22) is folded back to form a funnel-shaped hose; in that the fabric inlay (22) is connected to an inner wall of the connection hose (12) near a peripheral edge of its funnel opening (24) of larger flow cross-section; and in that the fabric inlay (22) is only partly connected to the inner wall of the connection hose (12) near the peripheral edge of its funnel opening (28) of smaller flow cross-section which protrudes into the connection hose (12) in the direction of the second chamber.

3. The non return valve in accordance with claim 1, further comprising:

a second fabric inlay which is connected to the first fabric inlay to form a second hose with an approximately uniform flow cross-section, wherein the second hose is connected to an inner wall of the connection hose near an inlet opening of the second hose which faces the first chamber, and wherein the second hose is freely movably accommodated in the connection hose.

4. Non return valve in accordance with claim 1, characterized in that the fabric inlay (92) is connected to a part of an inner wall of the connection hose (82) near its one side edge facing the first chamber in such a manner that an inlet opening (96) is formed which is bounded by the fabric inlay (92) and the inner wall of the connection hose (82); and in that the fabric inlay (92) extends diametrically through the connection hose (82) and is connected near its other side edge facing the second chamber at the surface of the inner wall of the connection hose (82) to form an outlet opening (102), with the flow cross-section of the outlet opening (102) being smaller than that of the inlet opening (96).

5. A non return valve for an airbag of a vehicle passenger retention system, which is adapted to form a flow connection between a first and a second airbag chamber, the non return valve comprising:

a connection hose which is adapted to be connected to the first and the second airbag chambers, said connection hose having a fabric inlay that subdivides the connection hose into a flow passage which is adapted to connect the first and the second airbag chambers and a pressure chamber which is adapted to be connected with the second airbag chamber, wherein the fabric inlay is adapted to open the flow passage when the internal pressure in the second airbag chamber is lower compared to the internal pressure in the first airbag chamber, wherein when the internal pressure is higher in the second airbag chamber, the fabric inlay is adapted to close the flow passage by means of the internal pressure in the pressure chamber, wherein the fabric inlay is sewn, with a gas-tight seam, to the connection hose or to a second fabric inlay or to both the connection hose and the second fabric inlay.

6. A non return valve for an airbag of a vehicle passenger retention system, which is adapted to form a flow connection between a first and a second airbag chamber, the non return valve comprising:

a connection hose which is adapted to be connected to the first and the second airbag chambers, said connection hose having a fabric inlay that subdivides the connection hose into a flow passage which is adapted to connect the first and the second airbag chambers and a pressure chamber which is adapted to be connected with the second airbag chamber, wherein the fabric inlay is adapted to open the flow passage when the internal pressure in the second airbag chamber is lower compared to the internal pressure in the first airbag chamber, wherein when the internal pressure is higher in the second airbag chamber, the fabric inlay is adapted to close the flow passage by means of the internal pressure in the pressure chamber, wherein the connection hose is formed by two fabric pieces which comprise pieces of the airbag, and wherein the connection hose is sealed at edges by a seam.

7. Non return valve in accordance with claim 2, characterized in that for forming the funnel-shaped hose the fabric inlay (22) with its superposed surfaces is accommodated between two fabric partial pieces (14, 16) and is sewn to the latter; and in that the hose is sewn to both fabric partial pieces (14, 16) near the peripheral edge of its funnel opening (24) of larger flow cross-section.

8. A non return valve for an airbag of a vehicle passenger retention system, which is adapted to form a flow connection between a first and a second airbag chamber, the non return valve comprising:

a connection hose which is adapted to be connected to the first and the second airbag chambers, said connection hose having a fabric inlay that subdivides the connection hose into a flow passage which is adapted to connect the first and the second airbag chambers and a pressure chamber which is adapted to be connected with the second airbag chamber, wherein the fabric inlay is adapted to open the flow passage when the internal pressure in the second airbag chamber is lower compared to the internal pressure in the first airbag chamber, wherein when the internal pressure is higher in the second airbag chamber, the fabric inlay is adapted to close the flow passage by means of the internal pressure in the pressure chamber, wherein a second fabric inlay is provided which is connected to the first fabric inlay and to form a second hose with an approximately uniform flow cross-section, wherein the second hose is connected to an inner wall of the connection hose near an inlet opening of the second hose which faces the first chamber, wherein the second hose is freely movably accommodated in the connection hose, and wherein the two fabric inlays are sewn to one another at their edges, wherein the connection hose is formed by two fabric pieces, wherein the two fabric inlays have near the inlet opening securing lugs which project to both sides, which are accommodated between the superposed surfaces of the fabric pieces, and which are sewn to the fabric pieces, and wherein near the inlet opening of the hose one fabric inlay is sewn to one fabric piece and the other fabric inlay is sewn to the other fabric piece.

9. Non return valve in accordance with claim 4, characterized in that the fabric inlay (92) is sewn to one fabric partial piece (84) near its side edge facing the first chamber and to the other fabric partial piece (86) near its side edge facing the second chamber.

10. An airbag for a vehicle passenger retention system, comprising:

a first chamber and a second chamber, and a non return valve having a connection hose which is adapted to be connected to the first and the second airbag chambers, said connection hose having a foldable fabric inlay that subdivides the connection hose into a flow passage which is adapted to connect the first and the second airbag chambers and a pressure chamber which is adapted to be connected with the second airbag chamber, wherein the fabric inlay is adapted to open the flow passage when the internal pressure in the second airbag chamber is lower compared to the internal pressure in the first airbag chamber, wherein when the internal pressure is higher in the second airbag chamber, the fabric inlay is adapted to close the flow passage by means of the internal pressure in the pressure chamber, and wherein the non return valve at least partly prevents a flowing back of gas from the second chamber into the first chamber.

* * * * *